US012781350B2

(12) United States Patent
Marlot Doerr et al.

(10) Patent No.: US 12,781,350 B2
(45) Date of Patent: Nov. 3, 2026

(54) BLACK COMPONENTS AND MANUFACTURING PROCESS THEREOF

(71) Applicant: The Swatch Group Research and Development Ltd, Marin (CH)

(72) Inventors: Agnès Marlot Doerr, Neuchatel (CH); Stewes Bourban, Chabrey (CH)

(73) Assignee: The Swatch Group Research and Development Ltd, Marin (CH)

( * ) Notice: Subject to any disclaimer, the term of this patent is extended or adjusted under 35 U.S.C. 154(b) by 868 days.

(21) Appl. No.: 18/040,280

(22) PCT Filed: Jun. 3, 2021

(86) PCT No.: PCT/EP2021/064933
§ 371 (c)(1),
(2) Date: Feb. 2, 2023

(87) PCT Pub. No.: WO2022/033741
PCT Pub. Date: Feb. 17, 2022

(65) Prior Publication Data

US 2023/0287573 A1 Sep. 14, 2023

(30) Foreign Application Priority Data

Aug. 11, 2020 (EP) .................................... 20190565

(51) Int. Cl.

| | |
|---|---|
| ***C23C 30/00*** | (2006.01) |
| ***A44C 27/00*** | (2006.01) |
| ***G04B 19/12*** | (2006.01) |
| ***G04B 45/00*** | (2006.01) |

(52) U.S. Cl.
CPC ............ *C23C 30/00* (2013.01); *A44C 27/006* (2013.01); *G04B 19/12* (2013.01); *G04B 45/0007* (2013.01); *G04B 45/0015* (2013.01)

(58) Field of Classification Search
None
See application file for complete search history.

(56) References Cited

U.S. PATENT DOCUMENTS

2007/0275264 A1 11/2007 Hultin et al.
2020/0354825 A1* 11/2020 Takazaki ................ C22C 14/00

FOREIGN PATENT DOCUMENTS

| | | | | |
|---|---|---|---|---|
| CH | 695 396 | A5 | 4/2006 | |
| CH | 709 669 | A1 | 11/2015 | |
| CH | 715365 | A2 * | 3/2020 | ............ G04B 19/12 |
| CN | 101163813 | A | 4/2008 | |
| CN | 711 141 | A2 | 11/2016 | |
| CN | 109328181 | A | 2/2019 | |
| CN | 110997971 | A | 4/2020 | |
| CZ | 2016-378 | A3 | 1/2018 | |

(Continued)

OTHER PUBLICATIONS

International Search Report issued Aug. 23, 2021 in PCT/EP2021/064933, filed on Jun. 3, 2021, 2 pages.

(Continued)

*Primary Examiner* — David Sample
(74) *Attorney, Agent, or Firm* — Oblon, McClelland, Maier & Neustadt, L.L.P.

(57) ABSTRACT

A component intended for internal parts or the movement of a timepiece or piece of jewellery includes a substrate coated at least partially with a black coat including aluminium oxide.

18 Claims, 4 Drawing Sheets

(56) References Cited

FOREIGN PATENT DOCUMENTS

| | | | | | |
|---|---|---|---|---|---|
| EP | 1522606 | A1 | * | 4/2005 | ......... C23C 14/0015 |
| JP | 62-96666 | A | | 5/1987 | |
| JP | 4-128375 | A | | 4/1992 | |
| JP | 06122961 | A | * | 5/1994 | |
| JP | 7-92276 | A | | 4/1995 | |
| JP | 2007-521401 | A | | 8/2007 | |
| JP | 2007-263718 | A | | 10/2007 | |
| WO | WO 2018/167599 | A1 | | 9/2018 | |

OTHER PUBLICATIONS

Combined Chinese Office Action and Search Report issued Dec. 9, 2024, in corresponding Chinese Patent Application No. 202180056412.5 (with English Translation), 18 pages.

Japanese Office Action issued Mar. 12, 2024 in Japanese Patent Application No. 2023-507962 (with unedited computer- generated English translation), 12 pages.

Combined Chinese Office Action and Search Report issued on Jun. 3, 2025 in Chinese Patent Application No. 202180056412.5, 8 pages.

* cited by examiner

BLACK COMPONENTS AND MANUFACTURING PROCESS THEREOF

CROSS-REFERENCE TO RELATED APPLICATIONS

The present application is a national stage entry of International Application No. PCT/EP2021/064933, filed Jun. 3, 2021, which claims priority to European Patent Application No. 20190565.0, filed on Aug. 11, 2020, the entire content and disclosure of each of which are incorporated by reference herein.

FIELD OF THE INVENTION

The invention relates to a component at least partially coated in black. This component is intended for the internal parts or the movement of a timepiece or piece of jewellery. It also relates to the process for manufacturing said component.

BACKGROUND OF THE INVENTION

Black "colour" can be obtained in the mass of a material by means of the intrinsic colour thereof or via the addition of pigments or colourants in the material. Black "colour" can also be present only on the surface. This surface colouring can be obtained from different materials, generally by oxidation/sulphuration/carburisation of a metal substrate or by depositing an oxide/sulphide/carbide on a substrate. Carbon is therefore an element well known for blackening a surface. Deposited in a longilineal manner in the form of nanotubes, the material formed is comparable to a perfectly absorbent black body capable of giving light absorption coefficients of up to 99.96% in the visible and near infrared ranges. This black is so perfect that it can hide 3D shapes of an object viewed from the front.

The use of black coatings is known in the field of watchmaking. From the document EP 3 327 517, a dial is known with a first substrate coated with a black coat of nanotubes facing the watch glass and with a second substrate fastened to the first substrate on the surface opposite the glass. The first substrate is pierced in order to make openings acting as windows intended to form indexes. The second substrate comprises a luminescent coating at least in the zones facing the openings so as to create a contrast at the first substrate between the black coat and the illuminated indexes.

Thus, the contrast is obtained via the superposing of two substrates having separate coatings. This superposing makes it possible to avoid selectively depositing both coatings on the same surface and handling the coat of nanotubes, which is particularly fragile, more than necessary. This superposing nevertheless has the drawback of requiring the manufacture of two substrates which increases the production costs.

From the document CH 711 141, a process for manufacturing a dial is known, where the decoration, namely the indexes, is affixed on the carbon black coating. The decoration is manufactured separately from the dial and then simply mounted which helps facilitate the manufacture of the dial substantially.

At the present time, these ultra-black absorbent depositions are formed from a carbon nanotube forest with vertical growth using a chemical vapour deposition method. To maximise the intense black appearance of the coating on a substrate, the majority of the carbon nanotubes must be deposited in a controlled orientation perpendicular to the substrate. This process applied directly on timepieces is complex to implement. In another process, paints or varnishes based on carbon nanotubes can be applied by spraying. This second process is easier to implement but produces less intense blacks. In both cases, the application and use of carbon nanotubes is complex to implement and can pose potential hazards in terms of safety during the manufacture of the coatings, assembly of the timepieces and after-sales service operations. Moreover, the forest structure of the coating based on carbon nanotubes makes it very fragile and difficult to handle. These coatings have a very low mechanical strength and are easily crushed even under the effect of light mechanical pressures. The coat can be so friable that it is virtually impossible to touch it without damaging the surface, showing glossy blooms or holes contrasting with the original colour of the carbon nanotubes. Furthermore, the forest structure of the coating does not allow the surface application of an overlying decoration with routine direct printing techniques.

Aims of the Invention

The aim of the present invention is that of overcoming the drawbacks of carbon nanotube-based coatings by providing another type of ultra-absorbent, stronger and more compact black coating to enable routine handling and decoration operations in the field of watchmaking or jewellery.

According to the invention, the black coating includes a metal oxide and in particular aluminium oxide deposited by PVD, CVD or PECVD type processes. This ultra-black decorative coating has the features of having:

- a reflectance less than 1.5% and a luminance value L in the CIELAB less than 12 and preferably 7 enabling high brightness and colour contrasts with respect to a decoration;
- a compact structure making it possible to mount decorations on the surface of the coating;
- a micrometric thickness enabling the enhancement of parts having a complex surface geometry and/or a characteristic horological decoration;
- a mechanical strength enabling an assembly of the coated parts in the watch or the handling thereof for decoration operations.

The present invention relates to the component at least partially coated with this black coating as well as the process for manufacturing said component.

Further features and advantages of the present invention will become apparent in the following detailed description with reference to the appended drawings.

DESCRIPTION OF THE INVENTION

The invention relates to a component intended for the internal parts or the movement of a timepiece or piece of jewellery. It can be chosen from the non-exhaustive list comprising a dial, a flange, a hand, an index, an applique, an oscillating mass, a plate, a bridge, etc. According to the invention, this component is at least partially coated with a black coat. As described hereinafter, the invention also relates to an assembly of two of said components at least partially coated with the black coat.

Figure 1:
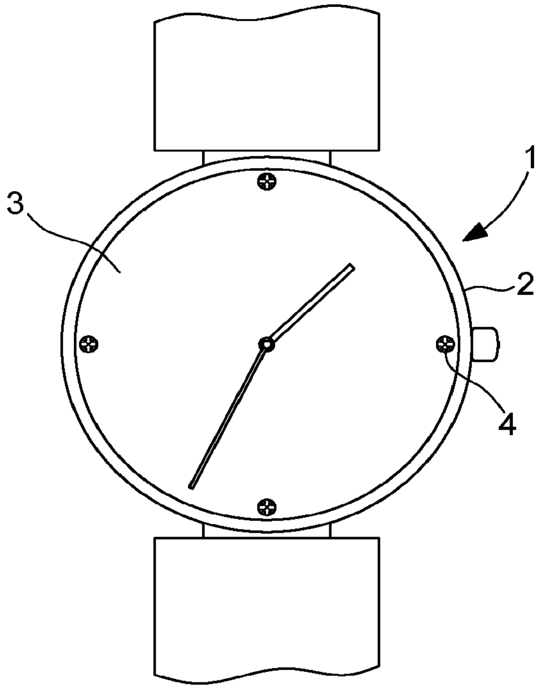
FIG. 1 is a representation in a plane view of a timepiece equipped with a dial coated and decorated according to the process of the invention.
Figure 2A:
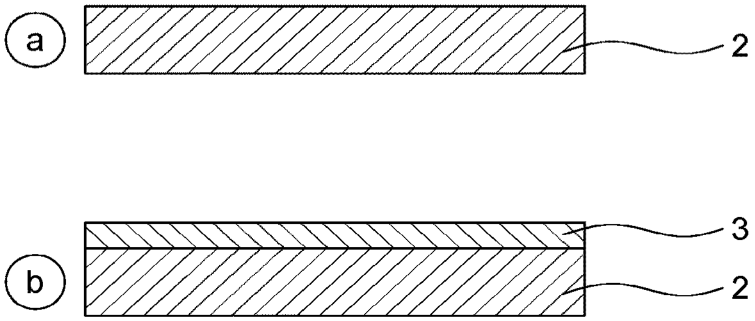
FIGS. 2A to 6 are schematic representations of different embodiments of the process according to the invention with the successive steps implemented.
Figure 2B:
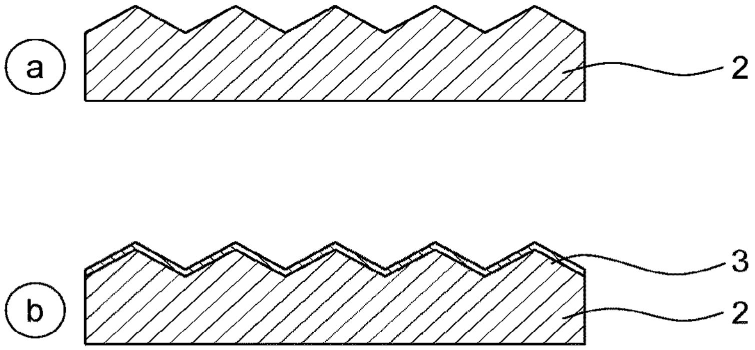
Figure 3:
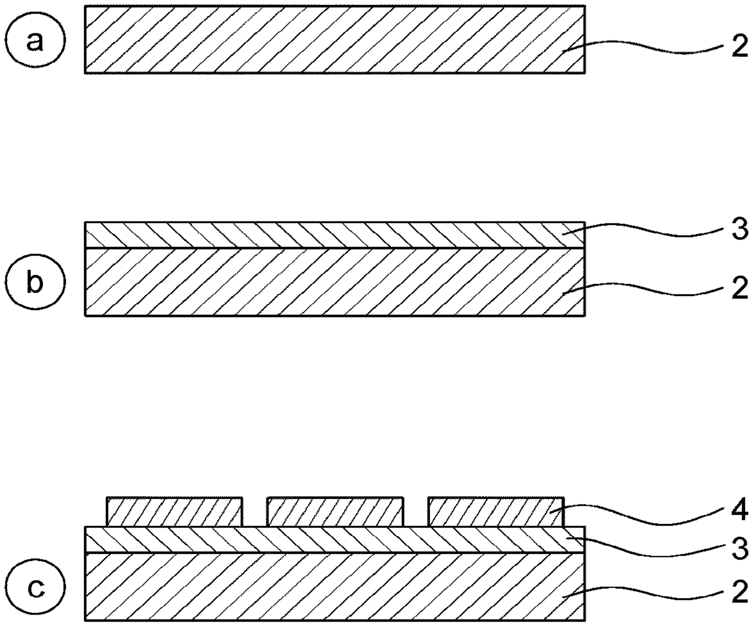

The invention will be described hereinafter within the scope of an application to a watch dial 1 formed from a substrate 2 coated at least partially with the black coat 3 as represented schematically in FIG. 1. Said substrate can be made of a metallic material such as steel, titanium, aluminium, a titanium or aluminium alloy, brass or any other alloy containing copper. It can also be made of a ceramic material, a cermet, of sapphire, of glass, of silicon, of composite or of a polymer.

According to the invention, the black coat, also referred to as black coating, is a coat comprising principally aluminium oxides $Al_xO_y$ such as $Al_2O_3$ with additionally non-ferrous metal oxides such as, for example copper, zinc, nickel, chromium, silver or manganese oxides. This coat includes at least 90% $Al_xO_y$, preferably 100% $Al_xO_y$. The aluminium oxide has an aluminium content between 45% and 65% by mass and preferably between 45% and 50% by mass. This layer has a thickness between 1 and 50 microns, preferably between 2 and 10 microns, and more preferably between 4 and 7 microns. It can be deposited by PVD (Physical Vapour Deposition), CVD (Chemical Vapour Deposition) or PECVD (Plasma-Enhanced Chemical Vapour Deposition).

The ultra-absorbent black depositions according to the invention has reflectance values in the visible range less than 2% and more specifically less than 1.5% as contained in Table 1 for coating thickness between 4 and 7 microns. The measurements are Total Hemispherical Reflectance (THR) measurements obtained by light absorption spectrometry.

TABLE 1

| Coating | Mean Reflectance | Min Reflectance | Max Reflectance |
|---|---|---|---|
| 1 | 1.1% | 1.05% | 1.22% |
| 2 | 1.19% | 1.14% | 1.26% |

In the CIELAB colour system (according to the standards CIE No. 15, ISO 7724/1, DIN 5033 Teil 7, ASTM E-1164), the brightness of timepieces thus coated is characterised by:

values of L* less than 12, preferably less than 7;

values of a* between −2 and +2, preferably between −1 and +1;

values of b* between −3.5 and +5, preferably between −3.5 and +1.

The black coating has a compact microstructure. This compact structure enables the application of decorations without damaging the black coating. The decorations can be of any type. They can consist of indexes, optionally photoluminescent, of jewels 4 set or glued onto the substrate 2 as shown in FIG. 1, elements made of metallic material, resin, composite material, wood, nacre, etc. They can also consist of luminescent elements such as LEDs.

The decorations are made or mounted on the black coating or on portions of the substrate devoid of black coating. These portions can be devoid of the black coating from the start or the coating can be selectively removed by mechanical machining, laser techniques or by ion or electron bombardment, for functional or aesthetic reasons. Pulse type lasers and in particular picosecond, nanosecond or femtosecond type lasers are chosen for the selective ablation of the black coating.

The decorations can be designed on the substrate by printing methods such as pad printing, digital printing or additive manufacturing. They can also be designed by electroforming or by hot forming of amorphous metals, for alternative embodiments where the decoration is produced on portions not coated with the black coat, directly on the metallic substrate. The decorations can also be mounted by gluing.

According to an alternative embodiment of the invention, the decoration can also be disposed under a discontinuous coat of the black coating. Thus, the component comprises a decoration on the surface of the substrate such as a metallic coating, a resin or a lacquer, including a photoluminescent lacquer. Then, the black coating is deposited on the decoration and removed selectively at chosen locations to reveal the decoration and thus create a contrasting decoration. Optionally, another decoration can be designed or mounted on the black coating.

The present invention also relates to an assembly comprising a first component and a second component each intended for the internal parts or the movement of a timepiece or piece of jewellery. According to the invention, the first and the second components include at least one portion coated with the black coat. Preferably, the first component has a relative movement with respect to the second component and is fitted facing the latter. This first component is decorated. For example, the first component is a hand coated with the black coat and decorated, and the second component is a dial coated with the black coat. For example, the hand is decorated with a jewel set or glued at the tip of the hand.

Different alternative embodiments for manufacturing the components according to the invention are represented in FIGS. 2A to 6.

The process for manufacturing the component includes at least:

a step a) of providing the substrate 2 and of machining said substrate. As represented schematically in FIG. 2B, the substrate 2 can have a relief structure after the machining, a step b) of providing on at least a portion of the substrate 2 the black coat 3 comprising principally the aluminium oxide(s).

Optionally, during step a), the substrate can undergo a micro-sandblasting or shot-blasting pre-treatment in order to increase the surface roughness (step not shown). The surfaces thus treated have a roughness Ra (arithmetic mean roughness) measured with an Altisurf 500 optical profilometer (ISO 4288:1996/4287:1997) between 0.4 and 5 microns and preferably between 0.4 and 2 microns.

Alternatively, once again optionally, the substrate can undergo an electrolytic oxidation pre-treatment of the plasma electrolytic anodisation or ceramisation type in order to give a rough black appearance on the surface of the part (step not shown). For this alternative embodiment, the substrate is preferably made of an alloy of titanium, e.g. Ti-6Al-4V or Ti-CP3, of aluminium, e.g. AA6061, AA2024, AA6082, of a mixed aluminium-titanium alloy or aluminium-lithium alloys. After this pre-treatment, the substrate undergoes the vacuum treatment in order to deposit the ultra-black coating on the surface.

Step b) can consist of a step of depositing the black coat on the substrate by PVD, CVD or PECVD. Alternatively, the black coat is deposited by PVD, CVD or PECVD on a thin film or strip type support and then glued onto the substrate (coat of glue or adhesive 5 in FIG. 5). The film or strip can be made of a polymer or metallic material comprising, on the face opposite the coating, the adhesive intended to be fastened to the substrate.

The manufacturing process can furthermore include a decoration step c) before and/or after step b). The decoration step can consist of designing a decoration on the coated portion or on an uncoated portion by the printing method or by electroforming. The decoration step can also consist of mounting the decoration on the coated or uncoated portion, the decoration being capable of being fastened, for example by gluing.

Figure 4A:
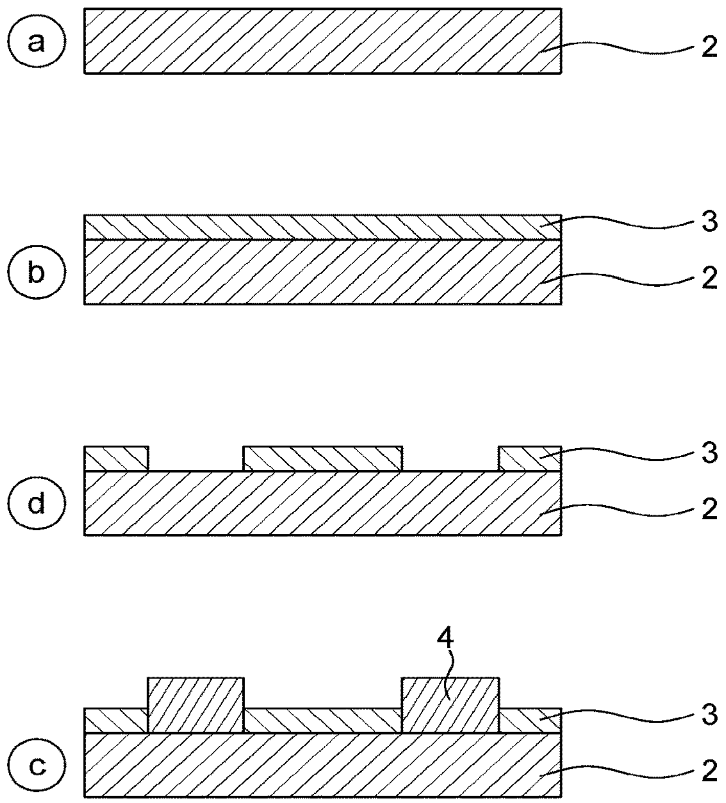
Figure 4B:
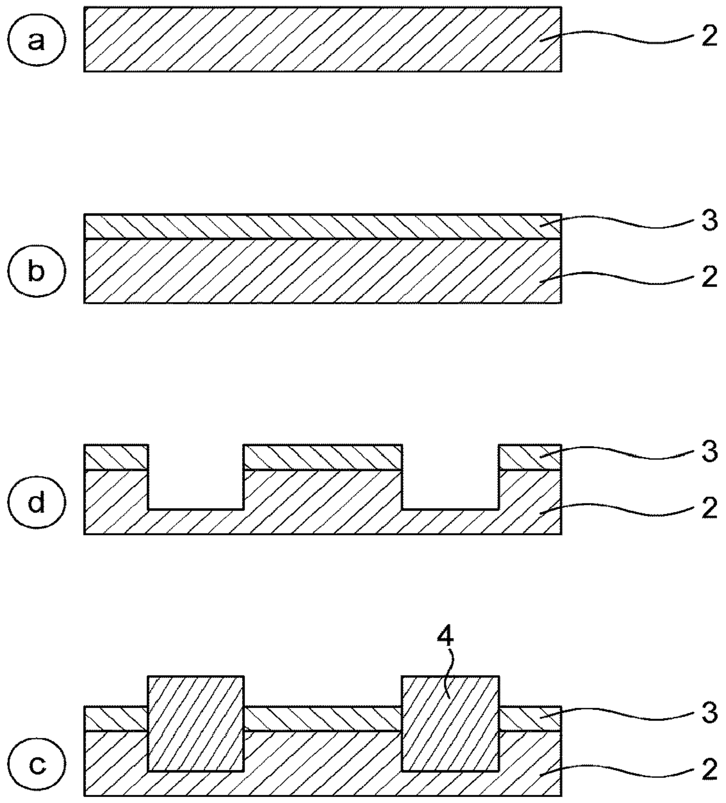
Figure 5:
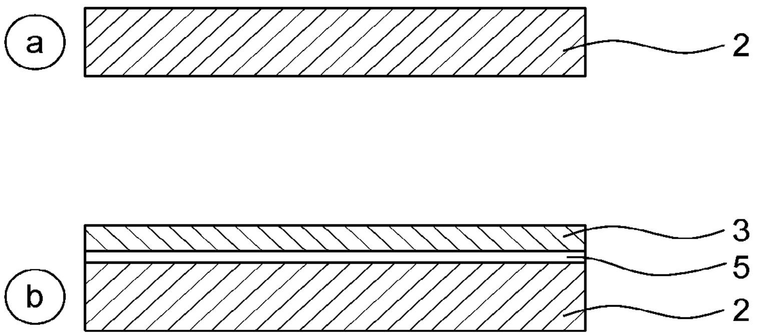
Figure 6:
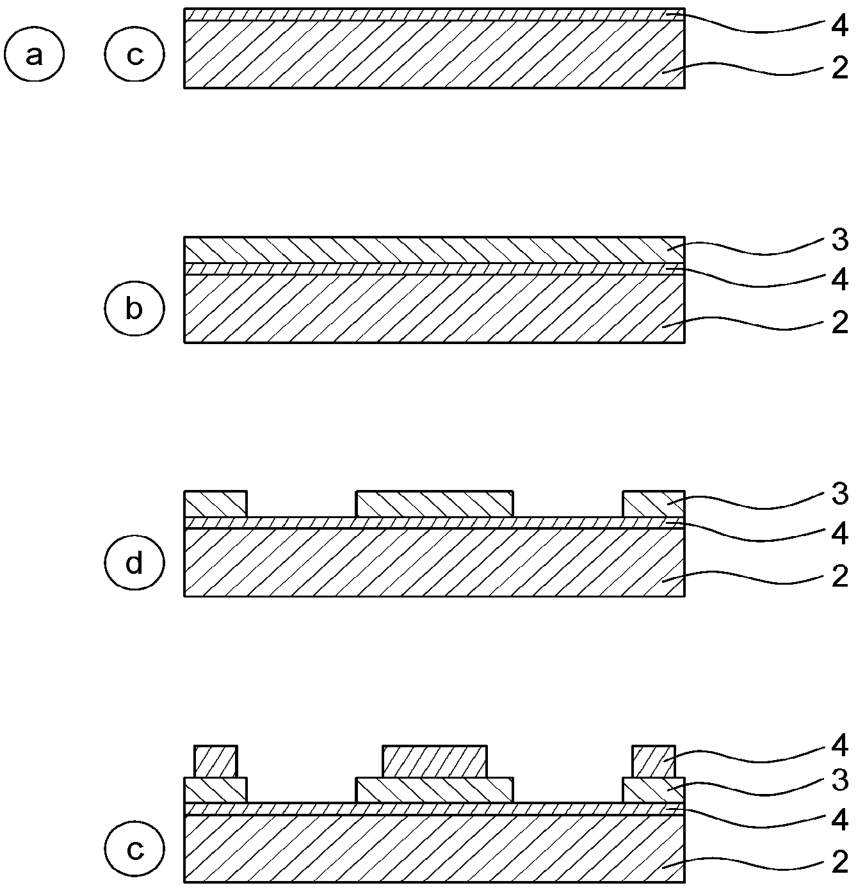

According to the alternative embodiments in FIGS. 3, 4A, 4B and 6, there is at least one step c) of decoration after the deposition of the black coat 3 in step b). This decoration step c) can be preceded by a step d) of selective removal of the black coat 3 on the zones intended to be decorated in step c) as illustrated in FIGS. 4A, 4B and 6. This selective removal can be limited to the black coat 3 (FIG. 4A and FIG. 6) or extend to the substrate 2 (FIG. 4B).

Alternatively, the process can include a decoration step c) before step b) of depositing the black coat 3 as illustrated in FIG. 6. The substrate is machined and decorated with a first decoration 4. The decorated substrate is then coated with the black coat 3 in step b). Then, the black coat 3 is selectively removed in step d) to reveal the first decoration 4 on certain portions. The manufacturing process can include a second step c) of decoration on the portions including the black coat 3. Preferably, the second decoration 4 only partially covers the black coat 3.

For all the alternative embodiments, the process can furthermore include an additional step (not shown) of depositing, on the black coat with or without decoration, a hard protective coating. This coating is an ALD (Atomic Layer Deposition) type transparent coating based on metal oxide such as $TiO_2$, $Al_2O_3$, $SiO_2$ or a mixture of at least two of these oxides. This hard coating has a thickness between 5 and 100 nm, preferably between 5 and 20 nm.

Key (1) Dial (2) Substrate (3) Black coat (4) Decoration, also referred to as first decoration or second decoration

The invention claimed is:

1. An internal part or movement component for a timepiece of piece of jewelry, comprising:

a substrate including at least one portion coated with a black coat comprising at least one aluminum oxide, the coated portion having in the CIELAB color system a value of L* less than 12, a value of a* between −2 and +2, and a value of b* between −3.5 and +5.

2. The internal part or movement component according to claim 1, wherein the black coat comprises at least 90% by weight of aluminum oxide.

3. The internal part or movement component according to claim 1, wherein the aluminum oxide has an aluminum content by weight between 45% and 65%.

4. The internal part or movement component according to claim 1, wherein the black coat has a thickness between 1 and 50 microns.

5. The internal part or movement component according to claim 1, further comprising a decoration on the coated portion of the black coat or on another portion of the substrate devoid of the black coat.

6. The internal part or movement component according to claim 5, further comprising another decoration disposed between the substrate and the black coat, said black coat being discontinuous to reveal said other decoration.

7. The internal part or movement component according to claim 6, wherein said other decoration is a metallic coating, a resin or a lacquer.

8. The internal part or movement component according to claim 5, wherein the decoration is made of a metallic, polymeric, composite material, of wood or of nacre or the decoration includes a LED.

9. The internal part or movement component according to claim 5, wherein the decoration is an index or a jewel glued or set on the substrate.

10. The internal part or movement component according to claim 9, wherein the index is photoluminescent.

11. The internal part or movement component according to claim 9, wherein the black coat is coated with a protective coat based on metal oxide.

12. The internal part or movement component according to claim 11, wherein the protective coat includes $TiO_2$, $Al_2O_3$ and/or $SiO_2$.

13. The internal part or movement component according to claim 1, wherein the internal part or movement component is chosen from the group comprising a dial, a flange, an index, a hand, an applique, an oscillating mass, a plate and a bridge.

14. The internal part or movement component according to claim 1, wherein the substrate includes a relief structure on the coated portion thereof.

15. An assembly comprising:

the component according to claim 1 and another component of internal parts or the movement for a timepiece or piece of jewelry, said other component being coated at least partially with said black coat.

16. The assembly according to claim 15, wherein the other component is disposed facing said component and fitted with a relative movement with respect to said component, the other component comprising a decoration.

17. The assembly according to claim 15, wherein the other component is a hand and the component is a dial, said hand comprising a decoration formed of a jewel.

18. A timepiece or piece of jewelry comprising the internal part or movement component according to claim 1.

* * * * *